United States Patent [19]

Jebens et al.

[11] 3,943,275

[45] Mar. 9, 1976

[54] PRECISION TURNTABLE ROTATION IN A VACUUM ATMOSPHERE

[75] Inventors: Robert Warren Jebens, Skillman; William Henry Morewood, Pennington, both of N.J.

[73] Assignee: RCA Corporation, New York, N.Y.

[22] Filed: Apr. 10, 1973

[21] Appl. No.: 349,775

[30] Foreign Application Priority Data

Apr. 19, 1972 United Kingdom............... 18152/72

[52] U.S. Cl. ..... 178/6.6 R; 178/6.6 DD; 178/6.6 P; 178/6.7 A; 179/100.3 V; 179/100.4 C; 360/73; 360/102

[51] Int. Cl.² H04N 5/76; G11B 11/00; G11B 17/00

[58] Field of Search .......... 178/6.6 R, 6.6 A, 6.6 P, 178/6.6 DD, 6.7 A; 179/100.3 V, 100.2 P, 100.1 B, 100.4 C; 340/174.1 E; 360/102, 86, 97, 99, 73

[56] References Cited

UNITED STATES PATENTS

| 3,030,452 | 4/1962 | Uritis............................ 340/174.1 E |
| 3,381,085 | 4/1968 | Johnson et al................... 178/6.7 A |

OTHER PUBLICATIONS

Magnetic Bearing, Brandenberg, IBM Tech. Disclosure Bulletin, Vol. 3, No. 1, 6/60, p. 13.

*Primary Examiner*—Raymond F. Cardillo, Jr.
*Attorney, Agent, or Firm*—Eugene M. Whitacre; Stephen Siegel; William H. Meagher

[57] ABSTRACT

Fluid from a hydraulic pressure source is utilized to rotate and support a turntable in a vacuum chamber. Signals representative of the rotational velocity of the turntable are utilized to control the hydraulic pressure of the fluid rotating the turntable.

13 Claims, 7 Drawing Figures

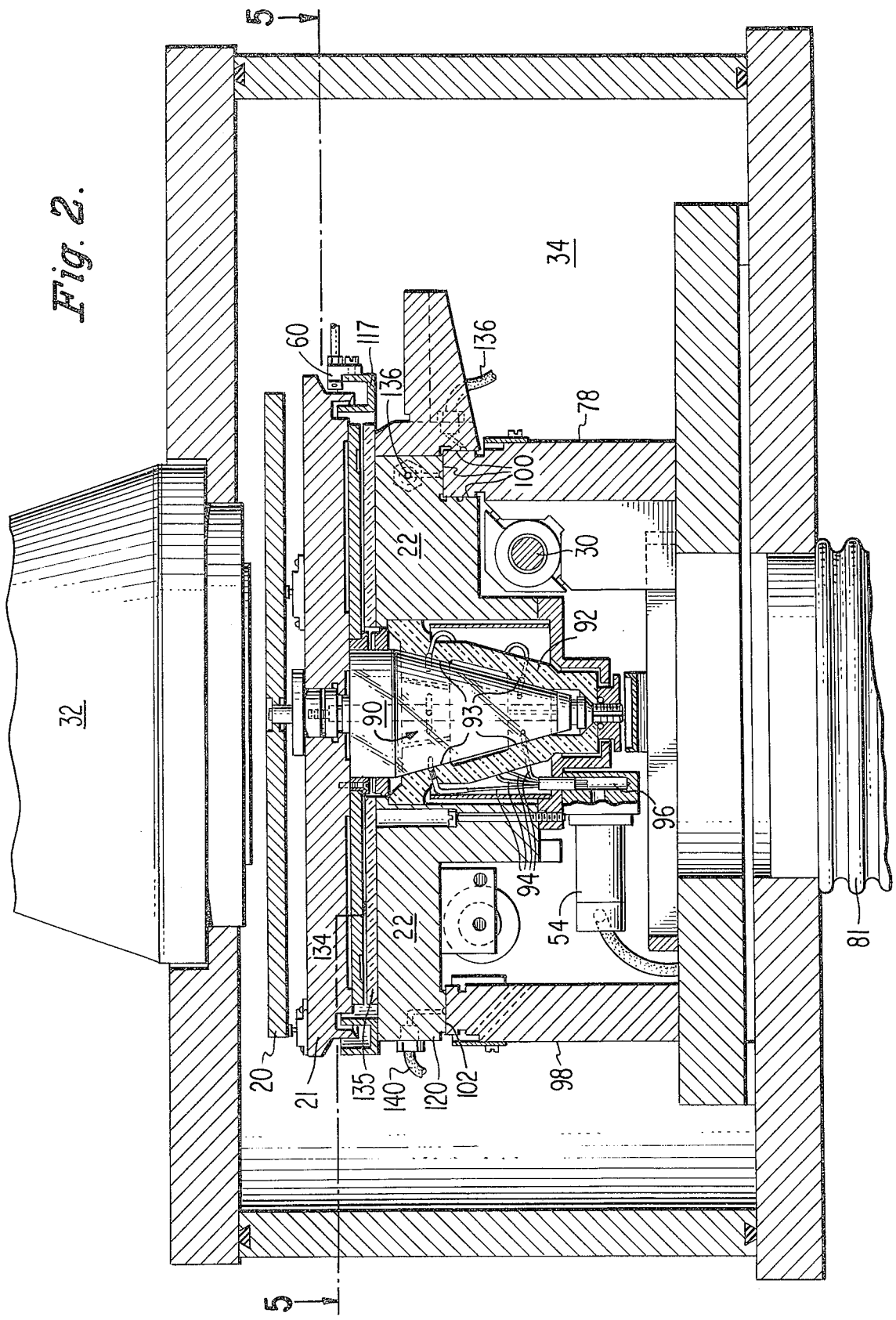

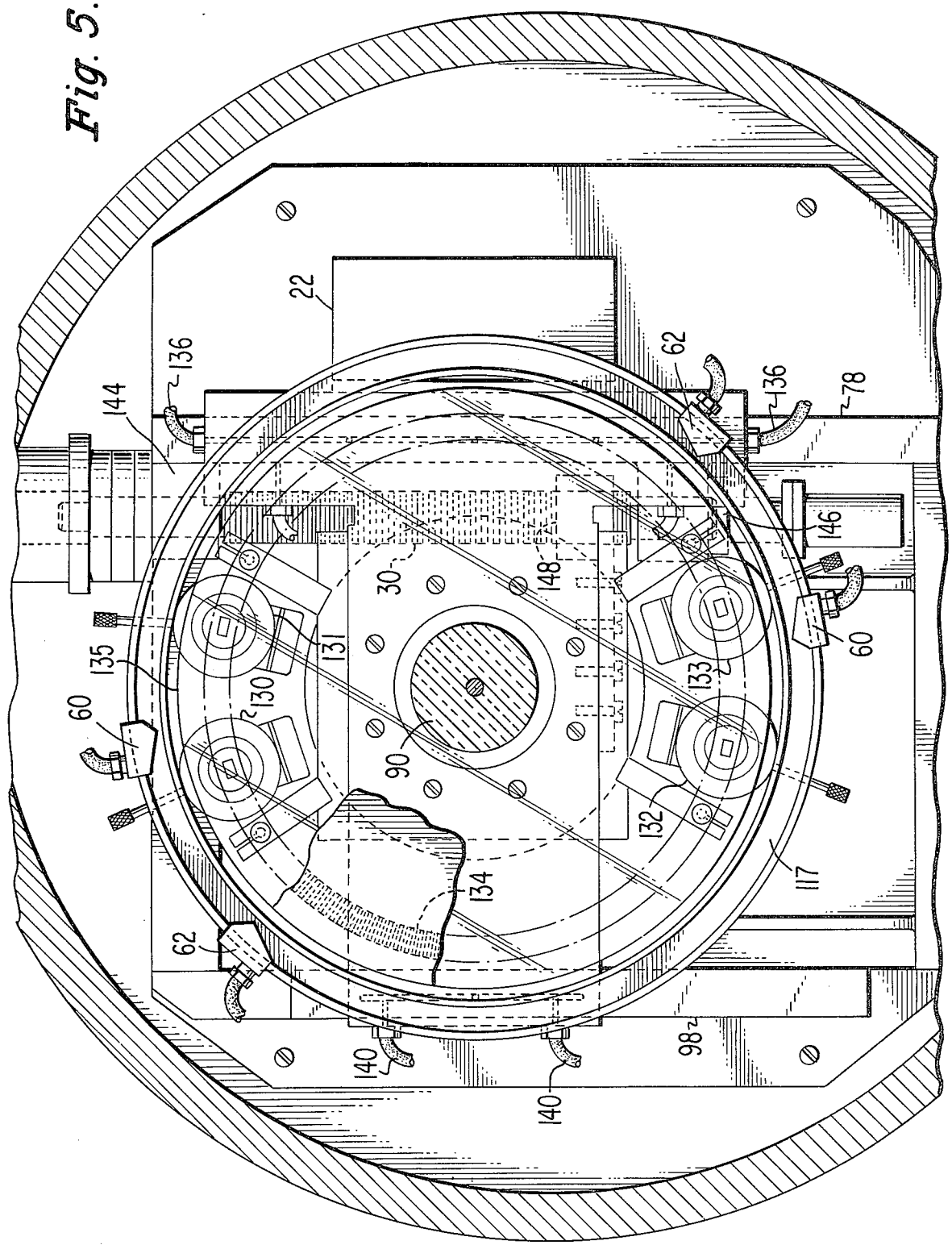

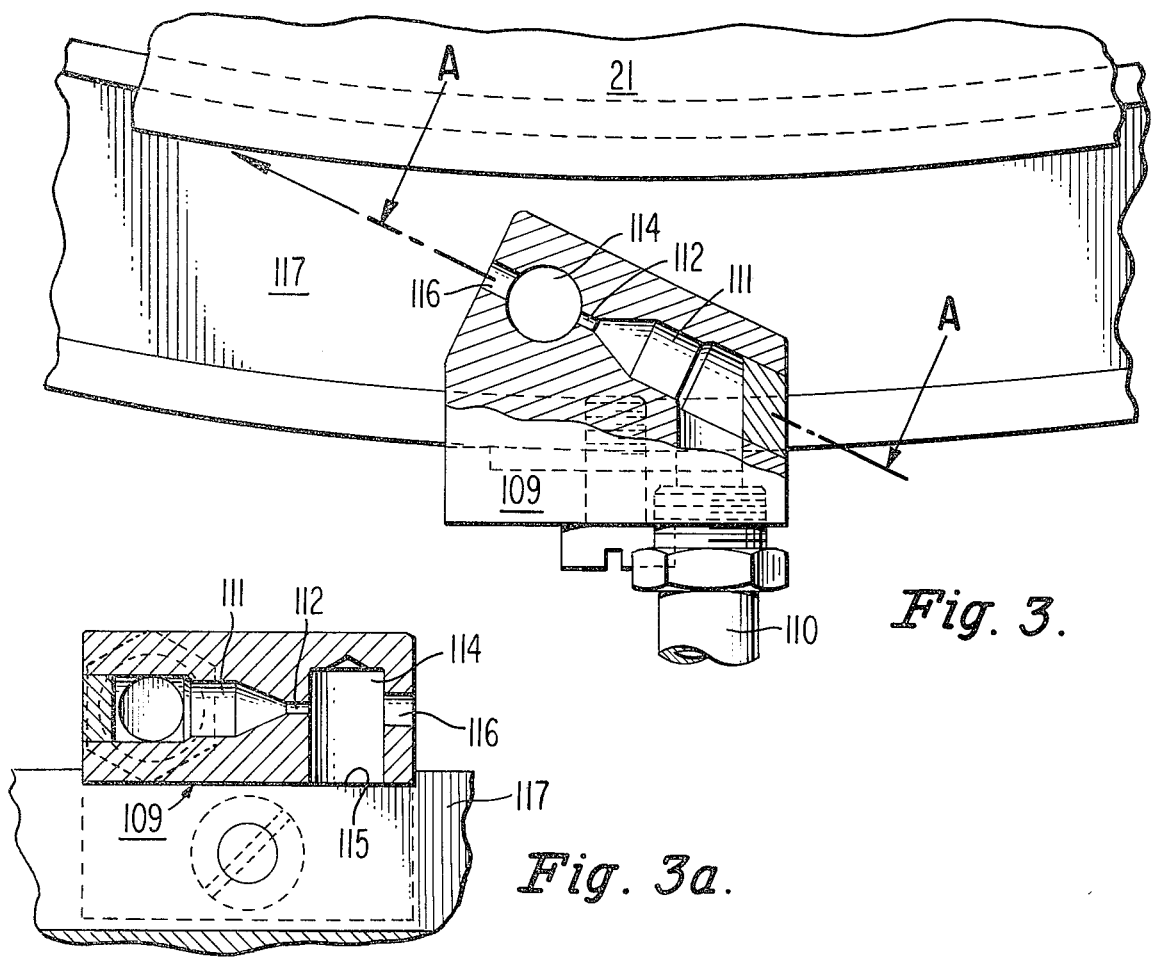
Fig. 3.
Fig. 3a.
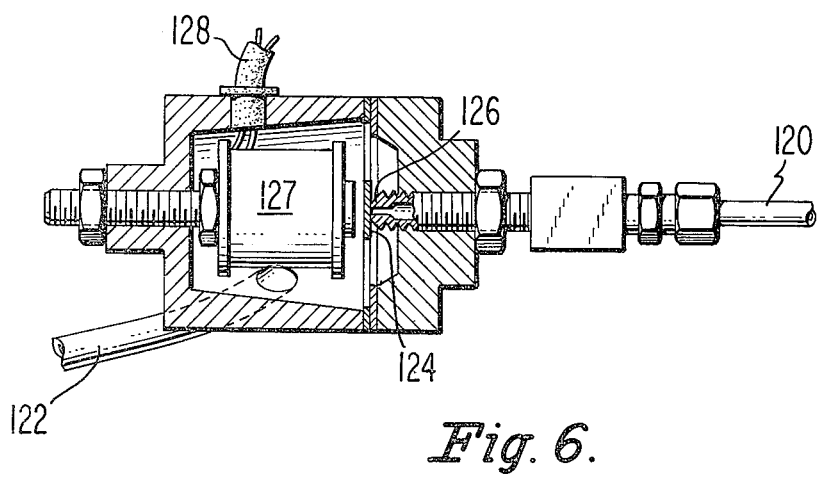
Fig. 6.

PRECISION TURNTABLE ROTATION IN A VACUUM ATMOSPHERE

BACKGROUND OF THE INVENTION

This invention pertains to apparatus required to provide precision mechanical rotation of a turntable in a vacuum atmosphere and more particularly, to precision turntable rotation suitable for electron beam recording of video discs.

A system for recording and playback of video information has been described in a copending U.S. application Ser. No. 126,772 of Jon K. Clemens filed Mar. 22, 1971. As described in the Clemens application, a lacquered surface is deposited on a thick aluminum disc and a continuous spiral groove is cut into the lacquered surface. A first nickel replica is then made of the grooved lacquer surface by depositing nickel over such surface and thereafter separating the nickel coating from the lacquer. This first nickel replica is a negative reproduction of the original grooved lacquer. A second nickel replica is made of the first replica to form a metal disc that is a positive reproduction of the original grooved lacquer. A uniform coating of energy sensitive material such as a photoresist is thereafter applied to the second nickel replica.

The photoresist-coated replica is then exposed by a video-signal-modulated beam of a scanning electron microscope which provides exposure of the photoresist in the groove region of the disc in correspondence to the video signal information. The photoresist is then developed and the exposed portions of photoresist are removed to form a topography in the groove corresponding to the video signal information. A nickel replication is made of the resultant disc and this replication is utilized to stamp or emboss vinyl records by techniques known in the audio recording art. The vinyl replica is then metalized to make the surface conducting and the metalization is thereafter coated with a dielectric. In playing back the recorded information, a stylus is caused to ride in the dielectric-coated groove. This stylus, along with the metalization and dielectric, acts as a capacitor. Capacitance variations in the groove, which correspond to the recorded video information, are then detected electronically to recover the video information.

Video discs produced, for example, in accordance with the above-described method contain closely spaced, signal representative, topographic patterns in the spiral convolutions of the disc. These topographic patterns may have successive peaks spaced as closely as 1.5 microns apart. In order to form the relatively small, and closely spaced video-representative topography, it is necessary to provide a relatively vibration-free turntable upon which the photoresist-coated video disc is mounted when the video information is recorded thereon. It is further necessary to provide a relatively constant and flutter-free rotational velocity of the turntable during the recording process. A turntable having a relatively flutter-free and constant rotational velocity is necessary to prevent subjectively objectionable disturbances (e.g., image jitter) from appearing on the video monitor during playback of the embossed or pressed video disc. The problems of providing a relatively vibration-free, flutterless, constant velocity turntable are compounded by the necessity of operating the electron microscope and therefore the turntable in a vacuum atmosphere. Recording on the video disc in a vacuum atmosphere is necessary to allow the video modulated recording beam of the scanning electron microscope to impinge directly upon the photoresist coated disc without interference from any atmospheric substances.

Turntable rotation in a vacuum atmosphere may be implemented by an electric motor mounted within the vacuum chamber. Electric motors, however, have the undesirable quality in that heat and magnetic fields are typically generated by their electric circuits. In a vacuum atmosphere, heat generated by the electric motor may not be dissipated by convection, thus undesirably limiting the means for cooling the motor. Magnetic fields generated by the electric motor may further produce the undesirable effect of perturbing the electron beam. It is therefore undesirable to utilize an electric motor housed within the vacuum chamber. Utilization of an electric motor mounted external to the vacuum chamber to drive the turntable presents other difficulties. Such an externally mounted electric motor is required to transmit rotational motion through a vacuum seal in the chamber, making the elimination of vibration and other disturbances difficult.

For reasons mentioned above, it is desirable to ameliorate all disturbances affecting smooth turntable rotation. Other disturbances, for example, those associated with the horizontal translation of the turntable, are less critical than those affecting rotation and need not be as precisely controlled. It is, therefore, particularly desirable to provide a rotational driving means that is free of external coupling, produces no electrical fields, and provides an accurate means of rotating a turntable in a vacuum chamber.

SUMMARY OF THE INVENTION

A system that provides precision turntable rotation in a vacuum atmosphere comprises a turntable mounted on a supporting means. The supporting means is coupled to a source of pressurized hydraulic fluid which provides a film of hydraulic fluid upon which the turntable rides. At least one jet located adjacent to the turntable and supplied by the source of hydraulic fluid provides a fluid stream which impinges upon and serves to rotate the turntable. A control means controls the flow of fluid through the jet. Coupled to the control means is a velocity sensing arrangement which operates to provide an output as a function of turntable rotational speed. The velocity sensing arrangement provides signals to a control valve which, in turn, controls fluid flow through the jet, thereby controlling the rotational speed of the turntable.

A better understanding of the invention may be obtained by referring to the detailed specification and the accompanying drawings, in which:

FIG. 2 is another view of the vacuum chamber and apparatus therein shown in FIG. 1;

FIG. 3 is a sectional view of a jet assembly suitable for utilization with the apparatus of FIG. 1;

FIG. 3a is a section along A—A of FIG. 3;

FIG. 5 is a partial sectional view illustrating a portion of a tachometer suitable for detecting velocity of the turntable illustrated in FIG. 1;

FIG. 6 is an electrically operated valve suitable for utilization with the apparatus shown in FIG. 1.

Figure 1:
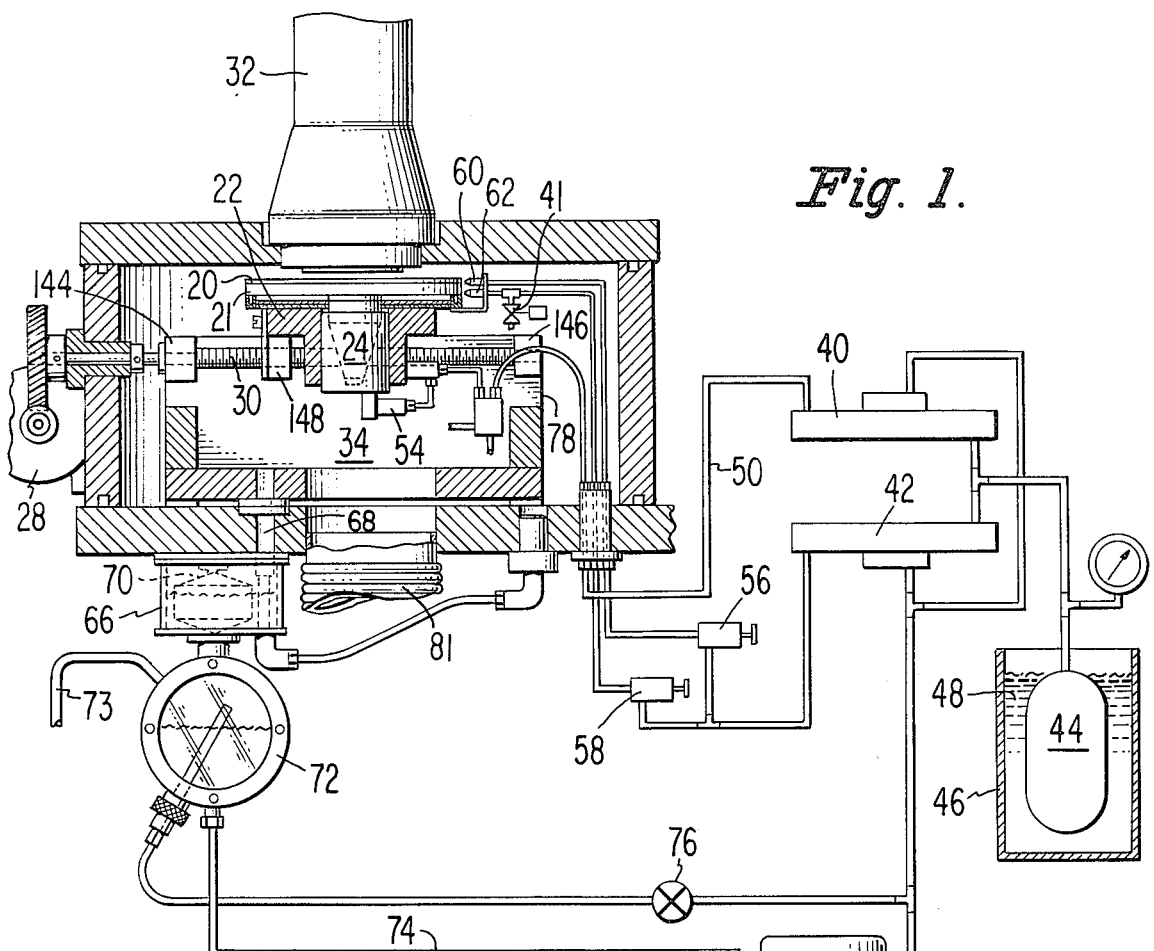
FIG. 1 is a diagrammatic representation of a hydraulically driven turntable situated under an electron microscope within a vacuum chamber in accordance with the present invention.

In FIG. 1, an electron microscope 32 (partially illustrated) is situated on top of and extends into a vacuum chamber 34. Within vacuum chamber 34, a turntable 21 is supported on a movable carriage 22 by means of a hydrostatic bearing 24. Carriage 22 is arranged to be translated in the horizontal plane by a lead screw 30 coupled thereto. Lead screw 30 is rotated by a motor 28 located outside of chamber 34 and is coupled to carriage 22 by a threaded lead screw follower 148. Bushings 144 and 146 are fixedly mounted to a hydraulic way 78 and provide support for lead screw 30.

A hydraulic pump 36 is coupled to a motor 38 for providing hydraulic pressure to first and second regulators 40 and 42. Regulators 40 and 42 have reference input ports coupled to a tank of nitrogen 44 for providing a regulating pressure reference. Nitrogen tank 44 is kept in a tank 46 containing water 48 for purposes of creating a large thermal mass and thereby maintaining the nitrogen at a relatively constant temperature. Pressure regulated hydraulic fluid flows from regulator 40 into a pipe 50 and is coupled to hydrostatic bearing 24 through a series of flow restricting pipes and a filter 54. Regulated hydraulic fluid is also coupled to the hydrostatic ways 78 and 98 through respective pipes 136 and 140 (see FIGS. 2 and 5). Pressure regulated hydraulic fluid passing through regulator 42 is coupled to valves 56 and 58. Valve 56 provides a rough adjustment for a relatively high pressure hydraulic fluid flowing to at least one drive jet 60. Valve 58 provides the rough adjustment of a relatively low pressure fluid flow to at least one control jet 62. The combined fluid output from jets 60 and 62 impinges upon a turntable 21 which supports a record disc 20, causing its rotation. A detailed description of jets 60 and 62 is given below with reference to FIG. 3. An electrically operated valve 41 is coupled to low pressure jet 62 and provides a means for diverting a portion of the fluid flowing to jet 62 away from the jet. Valve 41 is discussed in more detail below with reference to FIG. 6.

A fluid collecting tank 66 is coupled to the vacuum chamber 34 through a pipe 68. A float valve 70 situated within fluid collecting tank 66 operates in response to the hydraulic fluid level therein for transferring hydraulic fluid to a sump tank 72. A vacuum is maintained in sump tank 72 by a first roughing pump (not shown) coupled thereto by a pipe 73. A pipe 74 coupled to sump tank 72 supplies hydraulic fluid from this tank to hydraulic pump 36. A pressure relief valve 76 is interposed between sump tank 72 and pump 36 and operates in response to excessive hydraulic pressure in pipe 172 to relieve the excessive pressure therein. Vacuum chamber 34 is evacuated in a conventional manner by a second roughing pump and an oil diffusion pump (not shown) that are coupled to bellows 81.

In FIG. 2 disc 20 is shown mounted upon turntable 21 which in turn is coupled to a first glass cone 90 of the hydrostatic bearing 24 (shown generally in FIG. 1). Cone 90 is seated in a generally complementary-shaped glass cone 92 which is mounted to movable carriage 22. Flow-restricting (capillary) pipes 94 couple hydraulic fluid from a common chamber 96 into pressure pad areas 93 between cone 90 and complementary cone 92. The hydraulic fluid provided in these areas serve as the bearing surface for support of cone 90 and thereby turntable 21.

Carriage 22 is supported upon hydrostatic ways 78 and 98. Hydraulic fluid is supplied to surfaces 100 and 102 by respective flow-restricting pipes 140 and 136 and channels located in carriage 22. The hydraulic fluid supplied to the surfaces 100 and 102 of respective hydrostatic ways 78 and 98 provide a fluid film upon which carriage 22 rides.

FIG. 3 illustrates an embodiment of a jet assembly 109 such as may be used for jets 60 and 62. A pipe 110 is coupled from a source of pressure-regulated hydraulic fluid (e.g., regulator 42) to a first chamber 111 within jet 109. Hydraulic fluid entering chamber 111 passes through orifice 112, chamber 114 and orifice 116 onto the rim of turntable 21. As is shown in FIG. 3a, chamber 114 is cylindrical in shape having an open end 115 adjacent to a fluid-catching trough 117 (shown also in FIG. 2). Fluid is returned from trough 117 to tank 66 by appropriate collection pipes (not shown).

FIG. 5 is a top view of carriage 22 with turntable 21 and disc 20 removed. Four optical sensors 130 through 133 are fastened to a glass disc 135 in a position for optically sensing lines (for example, 10,800 in number) radially inscribed about a ring 134 located on the bottom of turntable 21. The optical sensors 130 through 133 together with line-inscribed ring 134 comprise the major portion of a turntable velocity-sensing tachometer.

Figure 4:
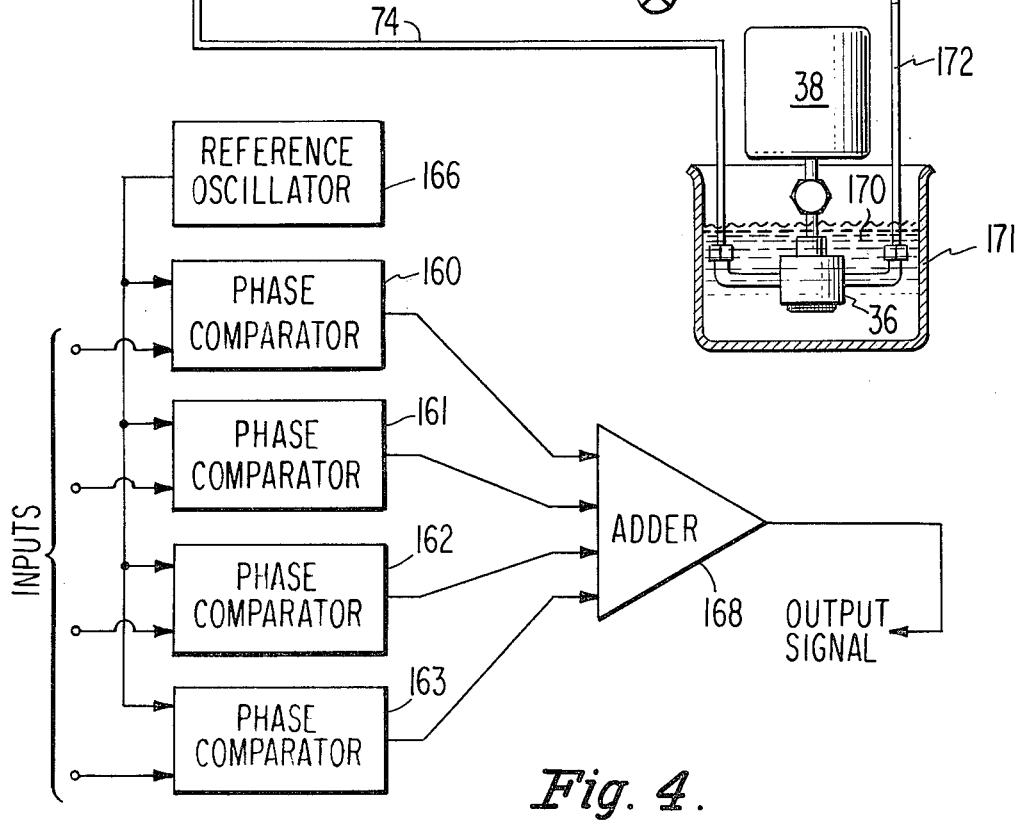
FIG. 4 is a block diagram of electrical circuitry suitable for use in conjunction with the tachometer of FIG. 5 for controlling the speed of the turntable illustrated in FIG. 1.

Output signals derived from the four optical sensors 130 through 133 are coupled to respective phase comparators 160 through 163 (see FIG. 4). A reference oscillator 166 is coupled to a second input of the respective phase comparators 160 through 163 and outputs from these comparators are coupled to adder 168. Signals provided at the output of adder 168 are coupled to control valve 41 for electrically controlling the flow of hydraulic fluid propelling turntable 21.

FIG. 6 is an embodiment of control valve 41. Hydraulic fluid enters pipe 120 and is prevented from passing to an output pipe 122 by a leaf spring 124 that rests against a valve seat 126. A solenoid 127 located adjacent to leaf spring 124 is electrically actuated through wires 128. Electric current passing into wires 128 causes solenoid 127 to magnetically attract leaf spring 124 removing it from seat 126 and thereby allowing hydraulic fluid to flow into output pipe 122.

In the operation of the apparatus shown in FIG. 1, chamber 34 is evacuated by a combination of a roughing pump and oil diffusion pump (not shown) through bellows 81 located at the bottom of chamber 34. The roughing pump is arranged, for example, to bring the internal chamber pressure down to about $10^{-3}$ mm. of mercury and the oil diffusion pump is arranged to reduce the vacuum further to about $10^{-6}$ mm. of mercury. This vacuum is sufficient for operation of the electron beam microscope 32.

To effect hydraulic fluid flow, pump 36 is driven by motor 38 and supplies fluid at an unregulated hydraulic pressure of about 140 pounds per square inch (psi). The hydraulic fluid supplied to pump 36 is of the same type as that utilized for the above-mentioned oil diffusion pump eliminating, thereby, the problem of contamination of one fluid with the other. The pressurized fluid supplied by pump 36 is utilized for driving the turntable jets 60, 62 and for supplying the hydrostatic bearing 24 and ways 78, 98 in the system. Hydraulic fluid 170, shown in container 171, surrounds pump 36 preventing air from entering its hydraulic mechanism. This hydraulic fluid serves only to seal pump 36 and is not intended to be pumped through the system. The unregulated hydraulic fluid flowing from pump 36 passes through hydraulic line 172 to regulators 40 and 42. Regulators 40 and 42 utilize the pressure of nitrogen contained within tank 44 as a regulating reference. The nitrogen pressure within tank 44 typically is in the order of 100 psi and preferably has a relatively long-term stability of one part within 100,000. Hydraulic pressure produced at the output of regulators 40 and 42 is substantially equal to that of the nitrogen pressure reference, i.e., 100 psi. Fluid at the regulated hydraulic pressure of regulator 40 flows into pipe 50 and from there is coupled to the hydrostatic bearing 24 and flow-restricting pipes 136 and 140 (FIGS. 2 and 5) on carriage 22. Precise hydraulic pressure regulation is desirable in order to maintain a relatively fixed distance between the conical portions of hydrostatic bearing 24 and between ways 78, 98 and carriage 22. Variations in hydraulic pressure cause, for example, the carriage 22 to change its vertical displacement with respect to ways 78 and 98 and thereby move turntable 21 in the vertical plane. It is necessary that the vertical positioning of turntable 21 remain relatively constant in order to maintain its relationship with respect to the focused electron beam of the electron microscope 32. Hydraulic fluid supplied to the hydrostatic bearing 24 and the surface of the ways 78 and 98 provides a thin film of fluid upon which turntable 21 is rotated and carriage 22 is translated. This thin film of fluid provides a relatively frictionless surface and is unaffected by the vacuum or lack of atmosphere within chamber 34.

Fluid at the regulated hydraulic pressure flowing from regulator 42 passes through control valves 56 and 58 and from there to respective jets 60 and 62. Valve 56 provides the adjustment for the relatively high pressure fluid flow out of jet 60 and is utilized to roughly set the rotational speed of turntable 21. Valve 58 provides the adjustment to the relatively low pressure output of jet 62 and is utilized as a fine adjustment to set the rotational speed of turntable 21.

Jets 60 and 62 as depicted in FIG. 3 have a chambered area 114 utilized to prevent air entrapped hydraulic fluid from splattering on the record disc 20. Air bubbles that have been trapped within the hydraulic flud would expand and burst if allowed to enter a vacuum atmosphere such as that within chamber 34. When the entrapped air bubbles enter chamber 114 of jet 109, they are subjected to the vacuum atmosphere of chamber 34 and expand and burst harmlessly within this chamber, preventing fluid from splattering upon the record disc 20.

Control valve 41 (details of which are shown in FIG. 6) is interposed between jet 62 and valve 58 and provides pressure control of the fluid output from jet 62. Hydraulic fluid is bypassed from jet 62 by fluid flow out of pipe 122 of control valve 41. When the electronic circuitry of FIG. 4, associated with the tachometer shown in FIG. 5, senses an increase in velocity of turntable 21, solenoid 127 in control valve 41 is energized pulling in leaf spring 124 and allowing hydraulilc fluid to flow through pipe 120 and out of pipe 122 thereby decreasing the hydraulic pressure at the output of jet 62.

Four optical sensors 130 through 133 (see FIG. 5) sense the rotary motion of turntable 21. Output signals from the optical sensors 130 through 133 are coupled to respective phase comparators 160 through 163 (see FIG. 4), each providing signals corresponding to the rate of movement of the radially inscribed lines below turntable 21. The frequency of the signals derived from the individual optical sensors is compared to a reference frequency provided by reference oscillator 166 and an error signal representative of the phase difference between the reference oscillator signal and the signal from each of the optical sensors is provided at the outputs of the respective phase comparators. Each of the error signals is coupled to adder 168 wherein an output signal representative of the cumulative error is provided. The single output from adder 168 representative of the cumulative phase error is coupled to control valve 41 for providing precise regulation of the speed of turntable 21.

Hydraulic fluid spent within chamber 34 flows through pipe 68 to a fluid collection container 66. When the fluid within container 66 reaches a predetermined level it causes float 70 to rise and allow the excess hydraulic fluid therein to flow into sump tank 72. Fluid collection container 66 is utilized to isolate the main portion of the hydraulic fluid, located in sump tank 72, from the air atmosphere when chamber 34 is opened. Isolation of the hydraulic fluid is necessary to prevent air from entering the fluid and requiring excessive evacuation to remove the entrapped air. A first roughing pump coupled to sump tank 72 maintains a vacuum therein during the time when chamber 34 is open further aiding the prevention of undesired air from entering the hydraulic fluid.

During the recording operation of the apparatus in FIG. 1 an electron beam from electron microscope 32 impinges upon the sensitized record disc 20 situated on top of turntable 21. This electron beam is utilized for inscribing signal information within a spiral groove previously formed in the sensitized record disc 20. In order for the electron beam to track the spiral groove, turntable 21 is translated in the horizontal plane by lead screw 30. Motor 128 located external to chamber 34 rotates lead screw 30 at a predetermined rate to cause carriage 22 to traverse in the horizontal plane along ways 78 and 98 and thereby allow the electron beam to follow the spiral groove in the sensitized disc 20.

What is claimed is:

1. In an electron beam disc recorder, apparatus to provide precision rotation of a disc suitable for storing information thereon comprising:

a vacuum chamber;

a turntable situate within said chamber, said turntable having a disc supporting surface terminating at a substantially cylindrical rim;

bearing means for supporting said turntable in said vacuum chamber;

apparatus for supplying pressurized hydraulic fluid coupled to said bearing means for providing hydraulic fluid thereto to support said turntable;

at least one jet means coupled to said source of hydraulic fluid and located adjacent to said turntable rim for causing pressurized hydraulic fluid to impinge upon said turntable rim, to the substantial exclusion of said disc supporting surface and disc, if any, supported thereon, whereby to cause rotation of said turntable; and control means responsive to rotational velocity of said turntable and coupled to said jet means for adjusting the flow of hydraulic fluid through said jet means to thereby control said rotational velocity.

2. Apparatus according to claim 1 wherein:
said bearing means includes a first cone coupled to said turntable;
a second generally complementary-shaped cone adapted for receiving said first cone; and
said apparatus for supplying hydraulic fluid is arranged to provide an oil film interposed between said first and second cones for separating said cones and providing a surface upon which said first cone is supported for rotation.

3. Apparatus to provide precision rotation of a disc suitable for storing information thereon comprising:
a vacuum chamber;
a turntable situate within said chamber;
bearing means for supporting said turntable in said vacuum chamber;
apparatus for supplying pressurized hydraulic fluid coupled to said bearing means for providing hydraulic fluid thereto to support said turntable;
at leastt one jet means coupled to said source of hydraulic fluid and located adjacent to said turntable for causing pressurized hydraulic fluid to impinge upon and cause rotation of said turntable;
control means responsive to rotational velocity of said turntable and coupled to said jet means for adjusting the flow of hydraulic fluid through said jet means to thereby control said rotational velocity;
pressure regulating means coupled to said fluid supplying apparatus for providing hydraulic fluid at a relatively constant pressure;
fluid diverting means coupled to said regulating means for controllably diverting the flow of said hydraulic fluid therethrough to first and second paths; and wherein
said jet means includes a first jet coupled to said regulating means and a second jet coupled to said first path.

4. Apparatus to provide precision rotation of a disc suitable for storing information thereon comprising:
a vacuum chamber;
a turntable situate within said chamber;
bearing means for supporting said turntable in said vacuum chamber;
apparatus for supplying pressurized hydraulic fluid coupled to said bearing means for providing hydraulic fluid thereto to support said turntable;
at least one jet means coupled to said source of hydraulic fluid and located adjacent to said turntable for causing pressurized hydraulic fluid to impinge upon and cause rotation of said turntable; and
control means responsive to rotational velocity of said turntable and coupled to said jet means for adjusting the flow of hydraulic fluid through said jet means to thereby control said rotational velocity;
wherein said control means includes a velocity detecting means for determining the speed of said turntable; and
fluid diverting means is coupled to said velocity detecting means for carrying away a selected portion of hydraulic fluid from said jet means.

5. Apparatus according to claim 4 wherein:
said velocity detecting means includes radial line segments uniformly dispersed about a side of said turntable;
at least one line detecting sensor arranged to detect passage of line segments past said sensor and provide an electrical output in response thereto;
an electrical frequency reference corresponding in frequency to the desired electrical output frequency from said sensor; and
at least one phase comparator coupled to said electrical frequency reference and to said electrical ouput from said sensor for providing an output signal responsive to the difference in phase between said reference frequency and said sensor output signal.

6. Apparatus according to claim 5, wherein:
said fluid diverting means includes an electrically operated valve coupled to said jet means for diverting a portion of said hydraulic fluid from said jet means and lowering the fluid pressure therein, said electrically operated valve further coupled to and responsive to signals from said phase comparator determinative of the portion of hydraulic fluid to be diverted from said jet means.

7. Apparatus for providing rotation and translation of a disc suitable for recording information thereon comprising:
a vacuum chamber;
a turntable situate within said chamber;
bearing means for supporting said turntable in said chamber;
translation means coupled to said bearing means for providing translation of said turntable in a predetermined direction;
apparatus for supplying pressurized hydraulic fluid coupled to said bearing means and to said translation means for providing a fluid surface upon which said turntable is supported for translation and rotation;
at least one jet means coupled to said source of hydraulic pressure and located adjacent said turntable for causing pressurized hydraulic fluid to impinge upon and cause rotation of said turntable;
fluid collecting means arranged to receive hydraulic fluid spent within said chamber for providing said fluid to said source of pressurized hydraulic fluid;
velocity detecting means for providing electrical signals responsive to the speed of said turntable; and
control means responsive to signals from said velocity detecting means for adjusting the flow of fluid through said jet means.

8. Apparatus according to claim 7 wherein:
said control means includes an electrical frequency reference corresponding in frequency to the desired electrical output frequency from said sensor;
at least one phase comparator coupled to said electrical frequency reference and to said electrical output from said sensor for providing an output signal responsive to the difference in phase between said reference frequency and said sensor output signal; and
an electrically operated valve coupled to said jet means for diverting a portion of said hydraulic fluid from said jet means and lowering the fluid pressure therein; said electrically operated valve further coupled to and responsive to signals from said phase comparator determinative of the portion of hydraulic fluid to be diverted from said jet means.

9. Apparatus according to claim 7 wherein:
said bearing means includes a first cone coupled to said turntable;

a second generally complementary-shaped cone adapted for receiving said first cone; and said apparatus for supplying hydraulic fluid is arranged to provide an oil film interposed between said first and second cones for separating said cones and providing a surface upon which said first cone is supported for rotation.

10. Apparatus according to claim 7 wherein:

said jet means includes a first jet arranged for providing a fluid output at a substantially constant pressure; and a second jet coupled to said control means for providing a fluid output in response thereto.

11. Apparatus according to claim 7 wherein:

said velocity detecting means includes line segments uniformly inscribed about a side of said turntable; and at least one line sensor arranged for detecting said line segments and for providing an output signal responsive to the presence and absence of said line segments.

12. Apparatus according to claim 7 wherein:

said translation means includes a carriage adapted for carrying said turntable;

ways for supporting and guiding said carriage;

a hydraulic fluid pressure source coupled to said carriage for providing a fluid film between said carriage and said ways upon which said carriage travels;

a lead screw fixedly mounted in said chamber and coupled to said carriage for converting rotary motion of said lead screw into translational motion of said carriage; and a motor coupled to said lead screw for providing rotation of said lead screw at a predetermined rate.

13. Apparatus according to claim 7 wherein:

said fluid collecting means includes a fluid collecting container for receiving hydraulic fluid spent within said chamber;

a float valve within said fluid collecting container for preventing fluid from exiting therefrom until said fluid reaches a predetermined level;

a sump tank coupled to said fluid exit of said fluid collecting container for receiving fluid that has exceeded said predetermined level in said collecting container whereby fluid in said sump tank is isolated from exposure to air when said chamber is not evacuated.

* * * * *